United States Patent
Birchfield et al.

(10) Patent No.: US 9,741,140 B2
(45) Date of Patent: Aug. 22, 2017

(54) FAST SOLVING FOR LOOP CLOSURE USING A RELATIVE STATE SPACE

(71) Applicant: MICROSOFT TECHNOLOGY LICENSING, LLC, Redmond, WA (US)

(72) Inventors: Stanley T. Birchfield, Sammamish, WA (US); Brian Kai Peasley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 555 days.

(21) Appl. No.: 14/281,668

(22) Filed: May 19, 2014

(65) Prior Publication Data
US 2015/0332489 A1 Nov. 19, 2015

(51) Int. Cl.
G06T 11/20 (2006.01)
G06K 9/00 (2006.01)
G06T 5/00 (2006.01)
G06T 7/70 (2017.01)

(52) U.S. Cl.
CPC ........ *G06T 11/206* (2013.01); *G06K 9/00476* (2013.01); *G06T 5/006* (2013.01); *G06T 7/70* (2017.01); *G06T 2207/20016* (2013.01); *G06T 2207/30241* (2013.01)

(58) Field of Classification Search
USPC ........................................................ 345/440
See application file for complete search history.

(56) References Cited

U.S. PATENT DOCUMENTS

| 7,437,279 B2* | 10/2008 | Agrawala | G01C 21/367 703/6 |
| 2008/0033645 A1* | 2/2008 | Levinson | G01C 15/00 701/469 |
| 2012/0306847 A1* | 12/2012 | Lim | G06K 9/00744 345/418 |
| 2014/0206443 A1* | 7/2014 | Sharp | G06T 7/0075 463/31 |
| 2015/0304634 A1* | 10/2015 | Karvounis | G06T 7/277 348/46 |

OTHER PUBLICATIONS

Brian Peasley, Large Scale 3D Mapping of Indoor Environments Using a Handheld RGBD Camera, Dec. 2013, Clemson University.*

"International Search Report and Written Opinion Issued in PCT Application No. PCT/US2015/28886", Mailed Date: Jul. 22, 2015, 9 pages.

Peasley, Brian K. , "Large Scale 3D Mapping of Indoor Environments Using a Handheld RGBD Camera", A Dissertation submitted, in Partial Fulfillment of the Requirements for the Degree Doctor of Philosophy, Dec. 2013, 146 pages.

* cited by examiner

*Primary Examiner* — Maurice L McDowell, Jr.

(57) ABSTRACT

The subject disclosure is generally directed towards a relatively fast and accurate technology that corrects mobile device (e.g., mobile robot) mapping data into corrected map data based upon detection of loop closure. A variation of stochastic gradient descent (with constraints in a deterministic order) may be used in a first correction phase to provide an updated graph in a relatively fast manner by operating in a relative state space. A graph-based variant of Gauss-Seidel that operates in a global state space may be used in a later phase to refine the updated graph into a more exact graph.

20 Claims, 8 Drawing Sheets

FAST SOLVING FOR LOOP CLOSURE USING A RELATIVE STATE SPACE

BACKGROUND

Some mobile robots (or similar mobile entities) collect data to map their movement paths. When mapping its path, if a mobile robot encounters the same location that it has encountered before, that is, "closes a loop," there generally needs to be a map correction; (note that any of a number of known ways may be used to detect loop closure). This is because sensing using wheel odometers or other techniques such as camera-based sensing of image features are imperfect. For example, wheel slippage or image processing errors or the like cause drifting that accumulates and makes the collected data incorrect.

In general, this problem is referred to as the loop closure problem in "simultaneous localization and mapping" (SLAM), or "PoseSLAM" when using only constraints between robot poses (as opposed to also using landmark positions). There is a similar problem in computer vision, in three dimensions, referred to as bundle adjustment.

Most approaches treat the loop closure problem as non-linear least squares, leading to complicated solutions that require sparse linear algebra packages and are limited in the map size they can handle. Other approaches minimize an objective function directly, but doing so requires a significant number of iterations, which makes such solutions computationally expensive.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards correcting mobile mapping data using a relative state space, (a transformation of global state space associated with each pose), which may be followed by a later phase that refines the corrected mobile mapping data using a global state space. A mapping component coupled to a mobile device includes a map corrector configured to process collected sensor-estimated data into a corrected map based upon differences in the collected sensor-estimated location data and a mobile device location at a time of loop closure detection. In one or more implementations, the map corrector includes a non-stochastic gradient descent component that uses stochastic gradient descent operations configured to operate in a deterministic order on constraint data in relative state space. The sensor-estimated data is iteratively updated into corrected data corresponding to a local minimum to provide the corrected map.

One or more aspects of the technology are directed towards collecting data corresponding to mobile device movement into a pose graph, and receiving an indication that loop closure has occurred. The pose graph is optimized, using processing based upon stochastic gradient descent, including iterating to update states in a relative state space, and outputting an updated pose graph having updated edge data.

One or more aspects of are directed towards optimizing a pose graph using a relative state space into a modified pose graph, and refining the modified pose graph using processing in a global state space to provide a more exact pose graph.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards formulating and solving the loop closure problem using a relative state space. In one or more implementations, non-stochastic gradient descent (a variation of stochastic gradient descent using constraints described herein) is performed using a relative (rather than incremental) state space for pose graph optimization. In actual practice, this leads to more than an order of magnitude improvement in the number of iterations needed for convergence.

An alternative solution described herein is a graph-based variant of the known Gauss-Seidel method. This graph-based variant approach uses a global state space, and although in general many iterations may be needed, each iteration is extremely fast.

The two solutions may be combined in a two-phased optimization approach, with non-stochastic gradient descent performed as a first phase for pose graph optimization, followed by a second phase based upon global state space. In general and as will be understood, the two-phased approach takes the first phase result, which is generally less exact, and refines the result in the second phase to a more exact solution.

It should be understood that any of the examples herein are non-limiting. For instance, while loop closure in two dimensions is generally described, the technology described herein applies to three dimensions, e.g., for bundle adjustment in computer vision. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computers, machines and mapping in general.

Figure 1:
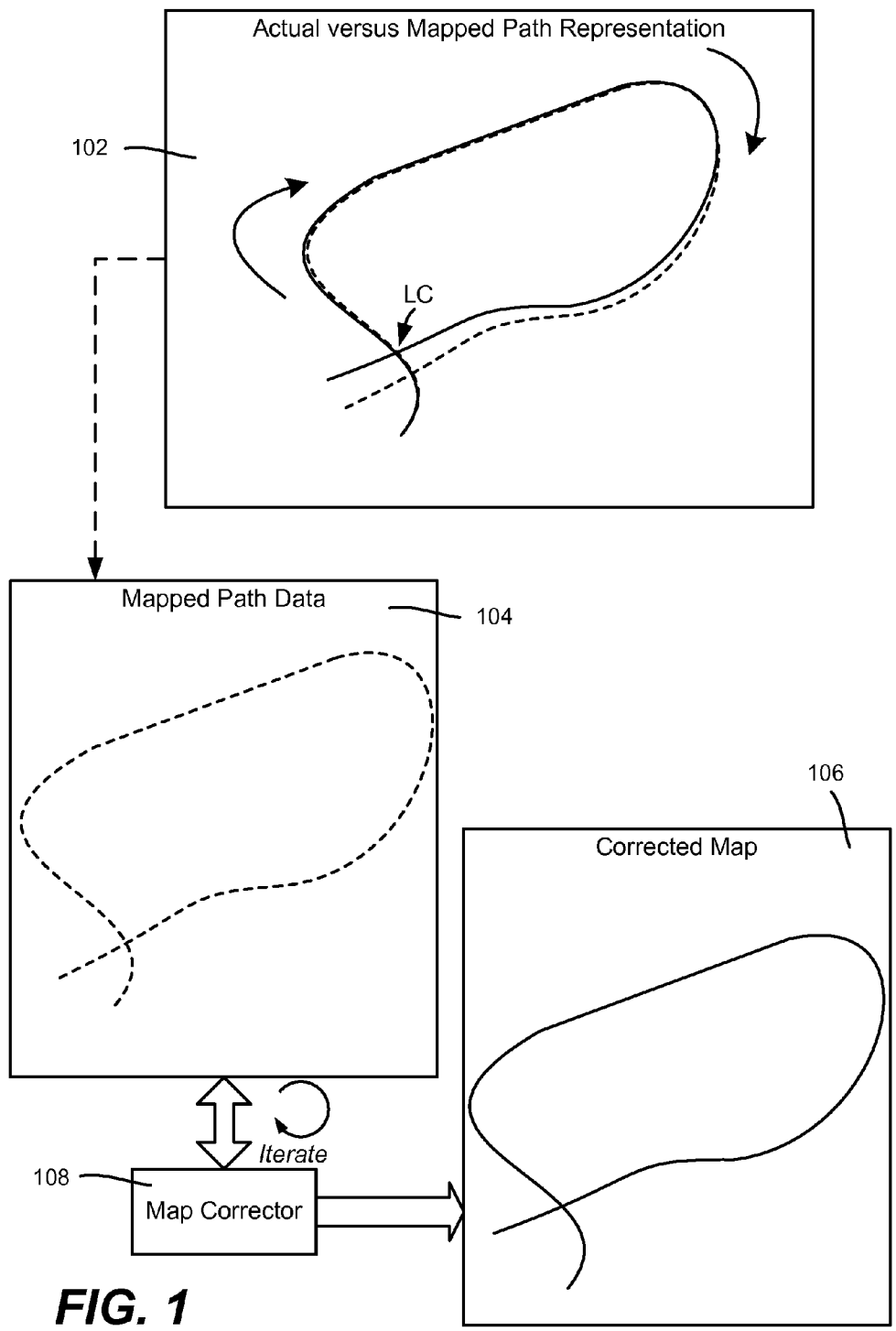
FIG. 1 is an example representation of correcting mapping data as estimated by mobile device sensors into a more exact map, according to one or more example embodiments.

FIG. 1 is a representation of a typical loop closure problem and relatively fast solution as described herein. As seen in the hypothetical representation 102 of an actual path taken versus the one that the sensors have mapped, there is some error that typically exists when loop closure (LC) is detected. Note that any number of ways to detect loop closure, such as based upon image capture and processing that detects image features that were previously captured, it is understood that any way to detect loop closure may be used. Loop closure detection is generally not described hereinafter for purposes of brevity.

In simultaneous localization and mapping (SLAM) solutions, a general goal is to process the input mapped path data 104 into a more exact map 106. Described herein is a map corrector 108 (which is one implementation is a two-phase process) that iteratively adjusts the mapped path data such that the mapped path data moves closer and closer (until convergence or other stopping criterion is detected) based upon the loop closure point (or points) until the more exact map 106 is provided.

Figure 2:
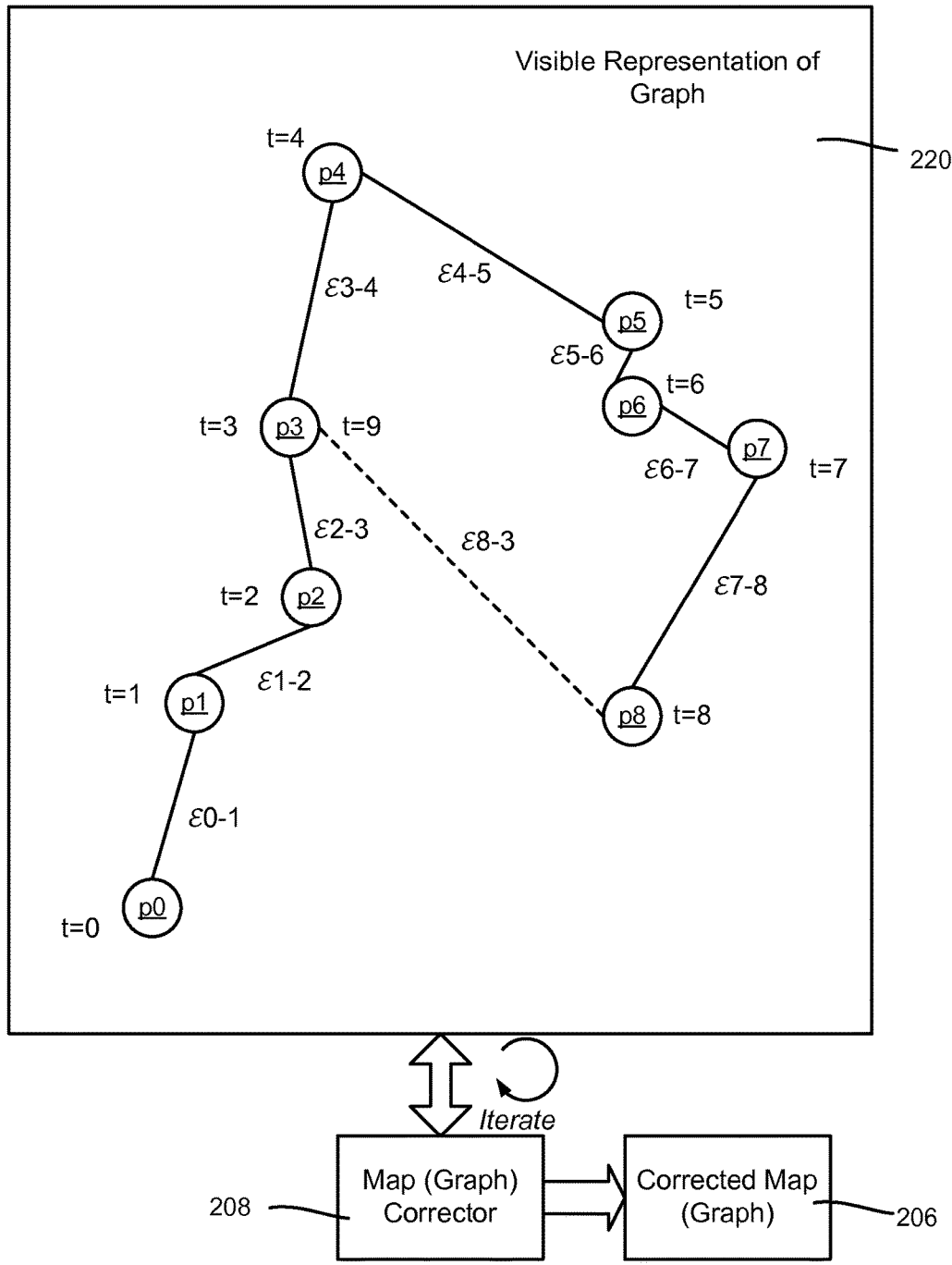
FIG. 2 is an example representation of a pose graph corrected into a corrected graph, according to one or more example embodiments.

A typical way in which the map path data may be maintained is in a pose graph. In a pose graph, the vertices comprise nodes representing robot poses that may be taken at regular time intervals (and in some implementations at detected landmarks). The edges include sequential edges (in time) and loop closure edges. Sequential edges between the nodes represent constraints (including relative rotation and translation when in two dimensions) between the sequential poses. For example, as generally represented in FIG. 2 as a visible representation 220 of a pose graph, in which lower-case 'p' represents a pose node, and 'ϵ' represents edge between nodes, and the time the pose data is captured is represented by t, a sequential edge ϵ 0-1 may encode information representing that between pose p0 and pose p1, taken at times t=0 and t=1 respectively, the robot moved two feet forward and turned five degrees right.

A loop closure between nodes/vertices is represented by a loop closure edge, which encodes constraints between non-sequential nodes, that is, between a prior node and a node that has been previously encountered. In the example of FIG. 2, a loop closure edge (shown in FIG. 2 as a dashed line) encodes the constraints between pose p8 and previously visited pose p3, which are non-sequential poses within the graph data. As will be understood, with the data in a graph data structure, the map corrector 208 is configured to process graph data into the more exact map, which may be output as a graph as well.

Figure 3:
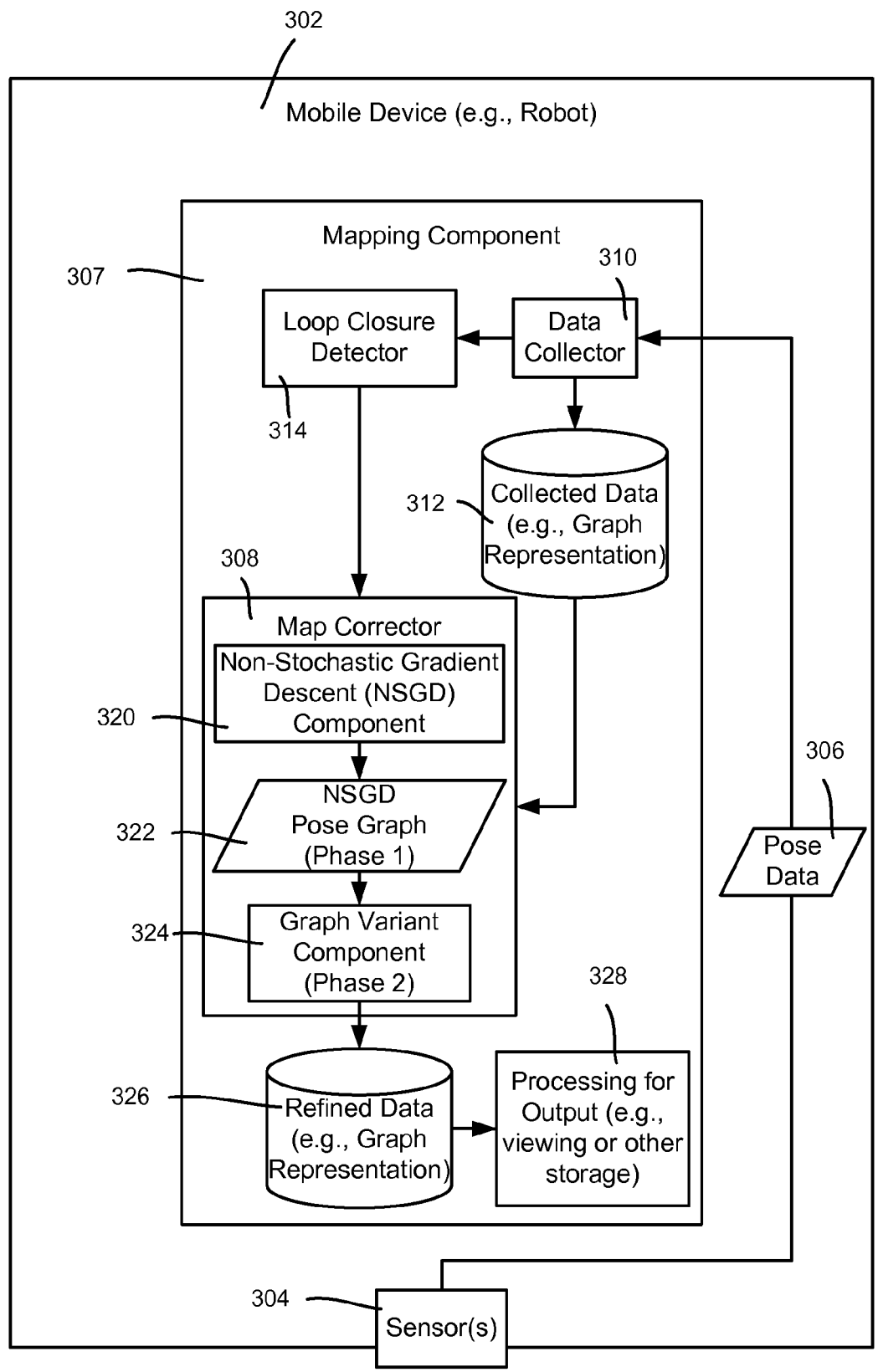
FIG. 3 is a representation of example components that may be configured to correct mapping data in a multi-phase correction operation including via a first relative state space-based component and a second global state space-based component, according to one or more example embodiments.

FIG. 3 is a block diagram generally showing example components that may be used one or more implementations to provide a relatively fast loop closure solution as described herein. A mobile robot 302 includes one or more sensors 304 by which pose data 306 may be collected and used by a mapping component 307. For example, the pose data 306 may be collected by a data collector 310 and maintained as a pose graph of vertices and edges in a suitable data store 312. The sensors 304 may include one or more odometers and/or cameras.

When loop closure is detected by a suitable loop closure detector 314, (or at another appropriate time such as multiple loop closures being detected), a map corrector 308 processes the collected data as described herein to correct for any inaccuracies due to drifting errors or the like.

As described herein, in one or more implementations, the map corrector 308 includes a non-stochastic gradient descent component 320 that outputs an corrected pose graph 322 (e.g., optimized to a local minimum) in a first phase, and a graph variant component 324 that refines the initially corrected pose graph 322 in a second phase into a more exact, refined set of data 326, e.g., a more exact pose graph. Note that in FIGS. 1, 2 and 3, the map correctors are labeled 108, 208 and 308, respectively, to show they may be at least be somewhat similarly structured and/or performing at least somewhat similar functionality. However, as will be understood, a map corrector need not implement the two-phase solution of FIG. 1; indeed, as will be understood, although the two-phased combination of the correction components 320 and 324 may be used, the non-stochastic gradient descent component 320 or the graph variant component 320 each may be independently used as a standalone solution, that is, without the other, to provide corrected pose data.

Instead of standing alone or used together, these correction components each may be combined with different solutions. For example, the correction component 320 that converges relatively quickly to a local minimum that is close to the global minimum may have its output refined into a more exact solution by a solution that is different from that provided by the component 324. Similarly, another solution (from that of component 320) can provide an updated graph that yields an approximate solution close to the global minimum that is then refined by the graph variant component 324.

In general, the technology thus may be implemented by equipping a mobile robot 302 (or any similar vehicle) with sensors 304 and supporting components able to detect incremental motion and loop closure events. As the robot (or vehicle) traverses an environment, a graph representation is built in which the nodes are the poses of the robot along its trajectory, and optionally the poses of any landmarks that the robot encounters, and the motion data constraints are the edges. To this end, once the robot poses have been determined, a map of the environment can be created by overlaying the sensor data obtained at the poses. The map may be output by processing the graph, e.g., via the component 328, for example, into a human-readable map or any other suitable format for output and/or storage (e.g., in some compressed form). For example, a robot may playback video of an environment as it is (or was) encountered in conjunction with a map, possibly including landmarks or the like, that shows a viewer where the robot currently is (or had been in space) at that time relative to the video images.

Note that while FIG. 3 shows the data collection and mapping/correction processing within the mobile device 302, it is understood that another computer or set of computers may perform at least some of the processing. For example, the mobile device 302 may be coupled to a remote computer and/or cloud service that collects uploaded sensor (e.g., odometry) data and performs the map correction operations. The sensor data may be compressed for transmission, for example.

Assuming a graph-based approach, the scenario in SLAM (including PoseSLAM) is to optimize the graph in the presence of loop closure. As described herein, when a loop is detected, a process/mechanism is employed to minimize an objective function.

One typical way this may be done in non-linear least squares, in which A is a matrix (typically sparse) that may be related to vector $\bar{b}$ by a linearized approximation, $A\bar{x}=\bar{b}$, solved by keeping A and $\bar{b}$ fixed and iterating until $\bar{x}$ is determined, then reconstructing A and $\bar{b}$ from $\bar{x}$. This conventional technique then iterates again and again with each iteration determining $\bar{x}$ to then reconstruct A and $\bar{b}$, which takes many iterations and is thus relatively slow. Moreover, such solutions are limited to relatively small matrices as they run out of memory after some number of nodes (e.g., on the order of thousands to hundreds of thousands) which is not suitable for many situations.

In contrast to this technique, described herein is operating on the graph data structure more directly/optimizing the function directly, e.g., without creating the A matrix or $\bar{b}$ vector. For example, one process described herein solves for an approximation for $\bar{x}$, $\hat{x}$ (a step in the correct direction), and updates the poses in the graph directly. Then the updated data in the updated graph is used with another approximation, to again update the graph data, and so on. Convergence may be based upon a suitable stopping criterion, e.g., based upon iterations or when poses are not changing much, as determined by a threshold evaluation.

More formally, a graph-based approach to SLAM attempts to find the maximum likelihood configuration given a set of measurements. The graph is given by $\mathcal{G}=(\mathcal{P}, \epsilon)$ containing a set of vertices $\mathcal{P}=\{p_i\}_{i=0}^n$ representing robot poses, and a set of edges $\epsilon$ between pairs of robot poses. Assuming a ground-based robot rolling on a horizontal floor plane, the ith pose is given by the vector $p_i=[x_i\,y_i\,\theta_i]^T$, where $[x_i\,y_i]^T \in \mathbb{R}^2$, and $\theta_i \in SO(2)$. Typically the poses are traversed in a sequential manner, whereby for convenience this sequence may be stacked into the vector $p=[p_1^T \ldots p_n^T]^T$. These poses are in a global coordinate system fixed by convention at $p_0=[0\,0\,0]^T$. Let $x=[x_1^T \ldots x_n^T]^T$ be a state vector that is uniquely related to the sequence of poses through a bijective function g such that $x=g(p)$ and $p=g^{-1}(x)$. In the simplest case, $x_i \equiv p_i$, so that the states are equivalent to the global poses, but this is not required. Indeed, the choice of state space can have significant impact upon the results, as described herein.

Each edge $(a, b) \in \epsilon$ captures a constraint $\delta_{ab}$ between poses $p_a$ and $p_b$ obtained by sensor measurements or by other suitable means. For simplicity, at most one edge between any two given poses may be assumed, however the extension to a multigraph is straightforward. The uncertainty of the measurement is given by the information matrix $\Omega_{ab}$, which is the inverse of the covariance matrix. If $f_{ab}(x)$ is the zero-noise observation between poses $p_a$ and $p_b$ given the current configuration x, then the discrepancy between the predicted observation and the actual observation is the residual:

$$r_{ab}(x) \equiv \delta_{ab} - f_{ab}(x) \tag{1}$$

Assuming a Gaussian observation model, the negative log-likelihood of the observation is given by the squared Mahalanobis distance:

$$\epsilon_{ab}(x) \propto r_{ab}^T(x) \Omega_{ab} r_{ab}(x) \tag{2}$$

A general goal of graph-based SLAM is to find the configuration x that minimizes the energy $\epsilon(x) \equiv \Sigma_{(a,b) \in \epsilon} \epsilon_{ab}$. This energy is a non-linear expression due to the orientation parameters, thus leading to an iterative approach. Let $\tilde{x}$ be the current estimate for the state. The linearized energy about this current estimate is given by $$\tilde{\epsilon}(x) \equiv \sum_{(a,b) \in \epsilon} \tilde{r}_{ab}^T(x) \Omega_{ab} \tilde{r}_{ab}(x), \tag{3}$$

where the linearized residual function is given by the first-order Taylor expansion:

$$\tilde{r}_{ab}(x) \equiv r_{ab}(\tilde{x}) - J_{ab}(\tilde{x})\underbrace{(x-\tilde{x})}_{\Delta x} \tag{4}$$

where $J_{ab}(\tilde{x})$ is the Jacobian of the error $e_{ab}(x) - r_{ab}(x)$ evaluated at the current state. Expanding the linear system, rearranging terms, differentiating $\partial \epsilon g(x)/\partial \Delta x$, and setting to zero yields:

$$\sum_{(a,b) \in \epsilon} \Omega_{ab}(r_{ab}(\tilde{x}) - J_{ab}(\tilde{x})\Delta x) = 0 \tag{5}$$

Defining K as the matrix obtained by concatenating the $\Omega_{ab}$ horizontally, $r(\tilde{x})$ as the vector obtained by stacking $r_{ab}(\tilde{x})$ vertically, and $J(\tilde{x})$ as the matrix obtained by stacking $J_{ab}(\tilde{x})$ vertically, a standard least squares system is obtained:

$$Kr(\tilde{x}) = KJ(\tilde{x})\Delta x \tag{6}$$

Multiplying both sides by $(KJ)^T$ yields the normal equations:

$$J^T(\tilde{x})\Omega J(\tilde{x})\Delta x = J^T(\tilde{x})\Omega r(\tilde{x}) \tag{7}$$

where $\Omega = K^T K$. Consider the dimensions of these matrices; letting m be the number of elements in the state vector, then $x_i$ is an m×1 vector; typically for two-dimensional (2D) pose optimization, m=3 due to the translation and orientation parameters. The vectors $x, \tilde{x}$ and $\Delta x$ are mn×1. Let m' be the number of elements in the observation $\delta_{ab}$; typically m'=m. Then $\delta_{ab}(x)$, $f_{ab}(x)$; $r_{ab}(x)$; and $\tilde{r}_{ab}(x)$ are m'×1 vectors, $\Omega_{ab}$ is m'×m', and $\epsilon_{ab}(x)$ and $\tilde{\epsilon}_{ab}(x)$ are scalars. The Jacobian $J_{ab}(x)$ is m'×mn. If n'=|$\epsilon$| is the number of edges in the graph, then $\Omega$ is m'n'×m'n', r(x) is m'n'×1, and J(x) is m'n'×mn.

As described herein, the choice of state space can have a significant impact upon the results. Further described are three different state spaces, in which m'=m=3.

Global state space refers to global pose, that is, the pose of the robot in a global coordinate system:

$$x_i \equiv p_i = [x_i y_i \theta_i]^T. \tag{8}$$

The use of a global state space leads to a simple formulation of the energy of the system and subsequently a sparse Jacobian. However, because the global state space representation directly solves for the global poses, each node is only affected by the nodes to which it is directly connected. This causes slow convergence because changes are propagated slowly and can become trapped in local minimum if the initial conditions are poor.

In incremental state space, the state is the difference between consecutive poses:

$$x_i \equiv p_i - p_{i-1} = \begin{bmatrix} x_i - x_{i-1} \\ y_i - y_{i-1} \\ \theta_i - \theta_{i-1} \end{bmatrix}, i = 1, \ldots, n, \tag{9}$$

with $x_0 \equiv [0\,0\,0]^T$.

With an incremental state space, the ith pose is given by the sum of the states up to and including $$p_i = \sum_{k=0}^i x_k \tag{10}$$

This state space allows changes to be propagated through the system quickly because changing one state affects the global pose of the nodes past it. However, the coupling between the different elements has been lost, so that a change in orientation for one node does not directly affect the positions of the other nodes.

Another alternative, used by the non-stochastic gradient descent component 120 described herein, is to use a relative state space (RSS):

$$x_i \equiv [x'_i y'_i \theta'_i]^T, \quad (11)$$

with $x_0 \equiv [0\ 0\ 0]^T$. In relative state space, changing one state affects the global pose of the nodes past it (and thus like incremental state space the changes propagate quickly), however (in contrast to incremental state space) the change in orientation is not lost. The parameters $x'_i$, $y'_i$ and $\theta'_i$ describe the relative transformation between the (i−1)th and ith poses, specifically the ith pose in the (i−1)th coordinate frame. Assuming a righthand coordinate system with positive angles describing counterclockwise rotation:

$$p_i = p_{i-1} + \underbrace{\begin{bmatrix} \cos\theta_{i-1} & -\sin\theta_{i-1} & 0 \\ \sin\theta_{i-1} & \cos\theta_{i-1} & 0 \\ 0 & 0 & 1 \end{bmatrix}}_{R(\theta_{i-1})} \underbrace{\begin{bmatrix} x'_i \\ y'_i \\ \theta'_i \end{bmatrix}}_{x_i} \quad (12)$$

$$= \sum_{k=0}^{i} R(\theta_{k-1})x_k \quad (13)$$

where $$\theta_b = \sum_{k=1}^{b} \theta'_k \quad (14)$$

is the global orientation, as described above. If $^a p_b$ is defined as the relative pose between a and b, a<b, that is, pose b in coordinate frame a, $$^a p_b = R^T(\theta_a)(p_b - p_a) = \sum_{k=a+1}^{b} R(^a\theta_{k-1})x_k \quad (15)$$

since $^0 p_b = p_b$ and $^0\theta_b = \theta_b$, where $$^a\theta_b = \theta_b - \theta_a = \sum_{k=a+1}^{b} \theta'_k \quad (16)$$

is the angle of frame b with respect to frame a. Note that $\theta_a = -^a\theta_0$, so that $R^T(\theta_a) = R(^a\theta_0)$.

In general, the solution to equation (7) is found by repeatedly computing $r(\tilde{x})$ and $J(\tilde{x})$ for the current estimate, solving the equation for $\Delta x$, then adding $\Delta x$ to the current estimate to yield the estimate for the next iteration. The process is repeated until the system converges (i.e., $\|\Delta x\| \leq \tau$, where $\tau$ is a threshold). The standard Gauss-Newton approach is to solve the equation directly in each iteration, leading to $$\Delta x = M^{-1} J^T(\tilde{x}) \Omega r(\tilde{x}) \quad (17)$$

where $M = J^T(\tilde{x}) \Omega J(\tilde{x})$ is a 3n×3n preconditioning matrix.

Stochastic gradient descent is a standard iterative method for finding the minimum of a function. Stochastic gradient descent repeatedly updates the state based on a single constraint between nodes a and b:

$$\Delta x = \lambda_{ab} M^{-1} J_{ab}^T(\tilde{x}) \Omega_{ab} r_{ab}(\tilde{x}) \quad (18)$$

where $\lambda_{ab} \equiv \lambda/|b-a|$, and $\lambda$ is a scalar learning rate that follows an exponential decay, and where the order of the constraints is chosen randomly.

Described herein is non-stochastic gradient descent, comprising an approach that is similar to stochastic gradient descent, except that the order is deterministic (as opposed to randomly), with constraints selected in decreasing order of the number of nodes they affect. Using a relative state space, the residual corresponding to a constraint between nodes a and b is given by:

$$r_{ab}(x) = \delta_{ab} - {}^a p_b. \quad (19)$$

The Jacobian of the residual associated with a constraint is obtained by differentiating equation (15) with respect to the states:

$$J_{ab} = [\ldots\ 0\ {}^a_b B_{a+1}\ {}^a_b B_{a+2}\ \ldots\ {}^a_b B_b\ 0\ \ldots] \quad (20)$$

where $$^a_b B_i \equiv \frac{\partial}{\partial x_i} {}^a p_b = \begin{bmatrix} \cos^a\theta_{i-1} & -\sin^a\theta_{i-1} & {}^a_b\alpha_i \\ \sin^a\theta_{i-1} & \cos^a\theta_{i-1} & {}^a_b\beta_i \\ 0 & 0 & 1 \end{bmatrix} \quad (21)$$

$$\begin{bmatrix} {}^a_b\alpha_i \\ {}^a_b\beta_i \end{bmatrix} \equiv \sum_{k=i}^{b} \begin{bmatrix} -x'_k \sin^a\theta_{k-1} - y'_k \cos^a\theta_{k-1} \\ x'_k \cos^a\theta_{k-1} - y'_k \sin^a\theta_{k-1} \end{bmatrix} \quad (22)$$

if a+1≤i≤b or $^a_b B_i \equiv 0$ otherwise, where 0 is a vector of zeros. As in the incremental state space approach, the Jacobian is not computed explicitly. In the general case the Jacobian is neither sparse nor linear. Plugging equation (20) into equation (18) yields a linear system that is difficult to compute due to the $M^{-1} = (J^T(\tilde{x})\Omega J(\tilde{x}))^{-1}$ term. Instead of explicitly computing this matrix, the process described herein instead ignores all but the diagonal elements:

$$M \approx \mathrm{diag}(J^T(\tilde{x})\Omega J(\tilde{x})) = \mathrm{diag}\underbrace{\left(\sum_{(a,b)\in\varepsilon} {}^a m_b\right)}_{m} \quad (24)$$

where $\mathrm{diag}(v) \equiv \Sigma_i e_i e_i^T v e_i^T$ creates a diagonal matrix from a vector, $e_i$ is a vector of all zeroes except a 1 in the ith element, and $$^a m_b = [\ldots\ 0\ {}^a\gamma_{a+1}\ {}^{Ta}\gamma_{a+2}^T \ldots {}^a\gamma_b^T 0 \ldots]^T \quad (25)$$

where $$^a\gamma_i \equiv \mathrm{diag}({}^a_b B_i^T \Omega_{aib} {}^a_b B_i) \quad (26)$$

and $\mathrm{diag}(A) \equiv \Sigma_i e_i^T A e_i e_i$ extracts the diagonal of a matrix.

When the constraint is between two consecutive nodes, b=a+1, the Jacobian reduces to a very simple form:

$$J_{ab} = [\ldots\ 0 I_{\{3\times3\}} 0\ \ldots] \quad (27)$$

where $I_{\{3\times3\}}$ is the 3×3 identity matrix, $\Omega$. Note that the vast majority of constraints in a typical pose optimization problem are between consecutive nodes, so that this simple form yields a significant speedup. Note also that as the preconditioned matrix is being constructed, the computation is simpler in the case of consecutive nodes:

$$^a m_b = [\ldots 0 \operatorname{diag}(\Omega_{ab}) 0 \ldots]^T \quad (28)$$

Plugging the simplified Jacobian of equation (27) into equation (18), approximating M by its diagonal elements, and taking the Moore-Penrose pseudo-inverse provides:

$$\Delta x = \lambda_{ab} M^+ [\ldots \; 0 \; \operatorname{diag}(\Omega_{ab}) \; 0 \; \ldots]^T r_{ab}(\tilde{x}) \quad (29)$$

$$\approx \lambda_{ab} [\ldots \; 0 \; I_{\{3\times3\}} \; 0 \; \ldots]^T r_{ab}(\tilde{x}) \quad (30)$$

$$= \lambda_{ab} r_{ab}(\tilde{x}) \quad (31)$$

where the second line is equal in the case of a diagonal $\Omega_{ab}$. Thus it can be seen that in the case of consecutive nodes, only one state needs to be modified, and the update is relatively straightforward. In the general case, the complexity of computing $J_{ab}^T \Omega_{ab} r_{ab}$ is proportional to the number of nodes between a and b.

Example first phase pseudo-code is set forth in the following table, (generally represented as steps in FIG. 5), where $m \equiv \Sigma^a m_b \equiv [m_1 \ldots m_n]^T$ is the vector such that $M \approx \operatorname{diag}(m)$, $r = [r_x \; r_y \; r_\theta]^T$, $\Delta = [\Delta_x \; \Delta_y \; \Delta_\theta]^T$ and $\operatorname{mod}_\theta$ computes the modulo of the last element of the vector while leaving the other elements unchanged:

---

Figure 5:
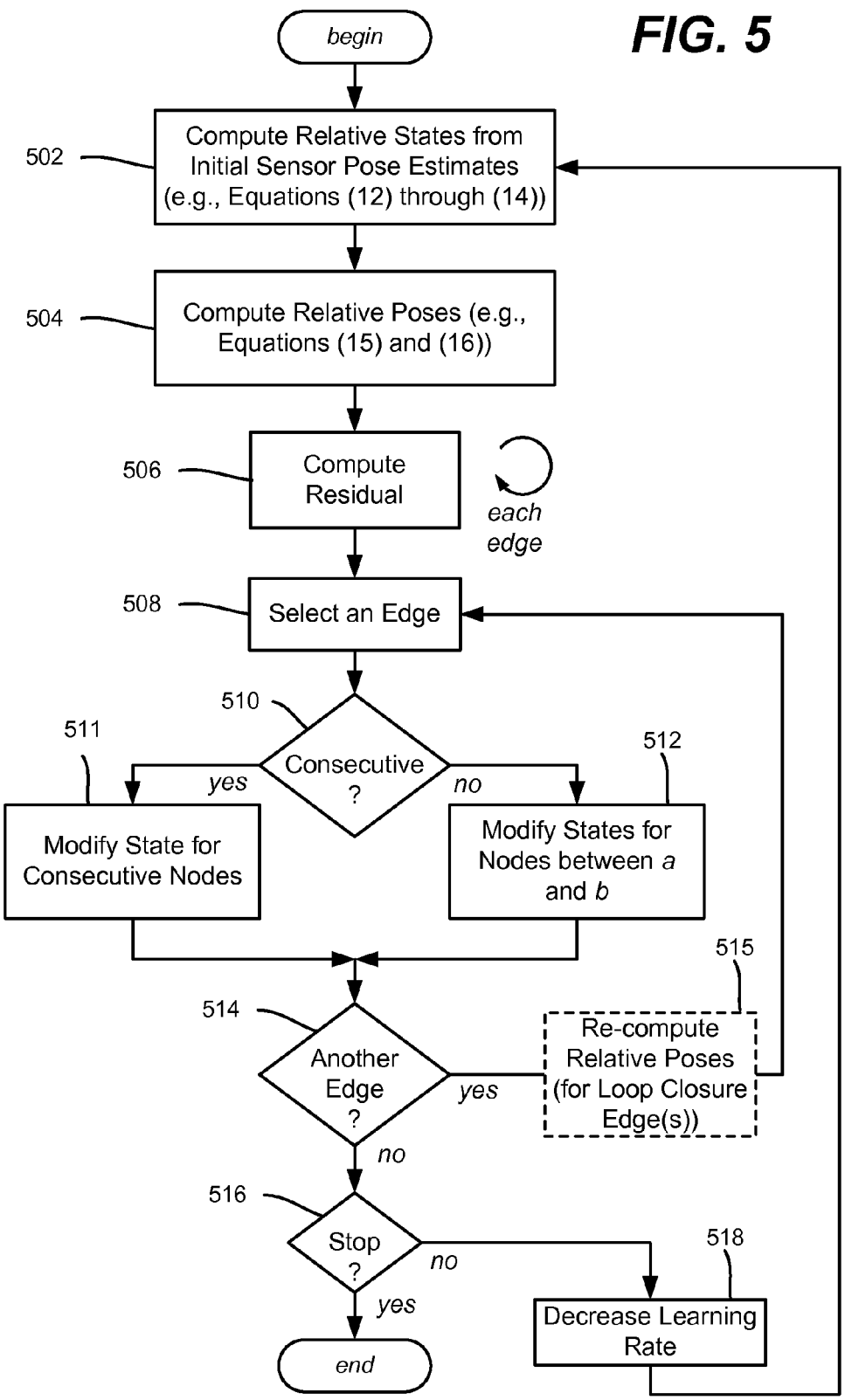
FIG. 5 is a flow diagram representing example steps that may be taken to correct map data in a relative state space using non-stochastic gradient descent, according to one or more example embodiments.

Input: relative states $x_{1:n}$, $\delta_{ab}$ and $\Omega_{ab}$ $\forall$ (a, b) $\in \epsilon$
Output: updated relative states $x_{1:n}$
▷Precompute M
m ← zeros (3n, 1)
for (a, b) ∈ ϵ do    ▷Note: a < b
   m ← m + $^a m_b$    ▷Note: compute residual, step 506 of FIG. 5
end for
▷Minimize
while not converged do    ▷Note: step 516 of FIG. 5
   for (a, b) ∈ ϵ do    ▷Note: a < b; also note step 514 of FIG. 5
     r ← ($\delta_{ab}$ − $^a p_b$) mod$_\theta$ 2π
     if b == a + 1 then    ▷Note: step 510 of FIG. 5
       $x_b$ ← $x_b$ + λr    ▷Note: step 511 of FIG. 5
     else    ▷Note: step 512 of FIG. 5
       r ← $\Omega_{ab}$ r
       for i ← a + 1 to b do
$$\Delta \leftarrow R(^a\theta_{i-1}) \begin{bmatrix} r_x \\ r_y \\ 0 \end{bmatrix} + r_\theta \begin{bmatrix} ^a_b a_i \\ ^a_b b_i \\ 1 \end{bmatrix}$$
$$x_i \leftarrow x_i + \frac{\lambda}{b-a} \begin{bmatrix} \Delta_x / m_{3i-2} \\ \Delta_y / m_{3i-1} \\ \Delta_\theta / m_{3i} \end{bmatrix}$$
       end for
     end if
   end for
   decrease λ    ▷Note: step 518 of FIG. 5
end while

---

As described herein, the use of non-stochastic gradient descent on a relative state space provides for quickly optimizing a pose graph. However, a more exact solution than the solution to which the non-stochastic gradient descent operation converges is often desirable. For a more exact solution, in one or more embodiments a second phase of an optimization process may be used. One such second phase is based upon a varied implementation of Gauss-Seidel that is optimized for a graph, e.g., performed by the graph variant component 324 of FIG. 3. This modified implementation finds more exact solutions and performs well given adequate initial conditions, (which may be provided as described above, e.g., by optimizing a pose graph via the use of non-stochastic gradient descent on a relative state space).

Note that in the phase two optimization described herein, a global state space is used rather than a relative state space. This is based upon the second phase providing a refinement to the original optimization, and prevents small changes to a state from having large implications on the entire system.

The residual is the same as before, but using the left side of equation (15) combined with equation (19) yields $$r_{ab}(x) = \delta_{ab} - R^T \theta_a (p_b - p_a) \quad (32)$$

To simplify the math, define $$r'_{ab}(x) \equiv R(\theta_a) r_{ab}(x) \quad (33)$$

$$= p_a - p_b \delta_{ab} + R(\theta_a) \delta_{ab} \quad (34)$$

$$\Omega'_{ab} \equiv R(\theta_a) \Omega_{ab} R^T \theta_a \quad (35)$$

and note that $\epsilon(x)$ does not change when substituting $r'_{ab}$ for $r_{ab}$, and $\Omega'_{ab}$ for $\Omega_{ab}$.

The modified graph variation of Gauss-Seidel differs from Gauss-Seidel by assuming that $R(\theta_a)$ is constant when taking the derivative $$\frac{\partial \epsilon(x)}{\partial p_i}.$$

Note that if $R(\theta_a)$ is constant, then $\epsilon(x)$ is convex in the states, and there is no need to linearize the system. Instead derivatives are taken to solve directly for the states, iterating by updating $R(\theta_a)$. Employing this assumption and setting the derivative to zero yields $$\sum_{(a,i) \in \varepsilon_i^{in}} \Omega'_{ai} r'_{ai}(x) = \sum_{(i,b) \in \varepsilon_i^{out}} \Omega'_{ib} r'_{ib}(x) = \quad (36)$$

where $$\varepsilon_i^{in} \equiv \{(a, b) : (a, b) \in \varepsilon \text{ and } b = i\} \quad (37)$$

$$\varepsilon_i^{out} \equiv \{(a, b) : (a, b) \in \varepsilon \text{ and } a = i\} \quad (38)$$

are the set of edges into and out of, respectively, node i.

Because a global state space is being used, x=p and $x_i = p_i$ for i=1, . . . , n. Rearranging terms yields $$\begin{bmatrix} \overline{\Omega}_1 & -\overline{\Omega}_{12} & \ldots & -\overline{\Omega}_{1n} \\ -\overline{\Omega}_{21} & \overline{\Omega}_2 & \ldots & -\overline{\Omega}_{2n} \\ \vdots & & \ddots & \vdots \\ -\overline{\Omega}_{n1} & -\overline{\Omega}_{n2} & \ldots & \overline{\Omega}_n \end{bmatrix} \begin{bmatrix} X_1 \\ x_2 \\ \vdots \\ x_n \end{bmatrix} = \begin{bmatrix} v_1 \\ v_2 \\ \vdots \\ v_n \end{bmatrix}, \quad (39)$$

where assuming there is not a multigraph, $$\overline{\Omega}_{ab} \equiv \overline{\Omega}_{ba} \equiv \begin{cases} \Omega'_{ab} & \text{if } \delta_{ab} \text{ exists} \\ \Omega'_{ba} & \text{if } \delta_{ba} \text{ exists} \\ 0_{\{3 \times 3\}} & \text{otherwise} \end{cases} \quad (40)$$

$$\overline{\Omega}_a \equiv \sum_b \overline{\Omega}_{ab} \quad (41)$$

-continued $$v_i \equiv \sum_{(a,b) \in \varepsilon_i^{in}} R(\theta_a)\Omega_{ai}\delta_{ai} - \sum_{(i,b) \in \varepsilon_i^{out}} R(\theta_i)\Omega_{ib}\delta_{ib}. \quad (42)$$

$$\underbrace{\phantom{\sum_{(a,b) \in \varepsilon_i^{in}} R(\theta_a)\Omega_{ai}\delta_{ai}}}_{\text{edges in}} \quad \underbrace{\phantom{\sum_{(i,b) \in \varepsilon_i^{out}} R(\theta_i)\Omega_{ib}\delta_{ib}}}_{\text{edges out}}$$

This can be solved using Gauss-Seidel iterations of the form:

$$x_i^{(k+1)} = \overline{\Omega}_i^{-1}\left(v_i + \sum_{j<i}\overline{\Omega}_{ij}x_j^{(k+1)} + \sum_{j>i}\overline{\Omega}_{ij}x_j^{(k)}\right), \quad (43)$$

where k is the iteration number. To improve convergence, successive over-relaxation (SOR) may be used. Note that unlike Gauss-Seidel, the modified graph variation described herein does not actually minimize a linear system, as it instead re-computes the vector v each iteration. The algorithm is fast because the matrix remains constant.

The following table comprises pseudo-code for the modified graph algorithm (generally represented as steps in FIGS. 6 and 7):

---

Figure 6:
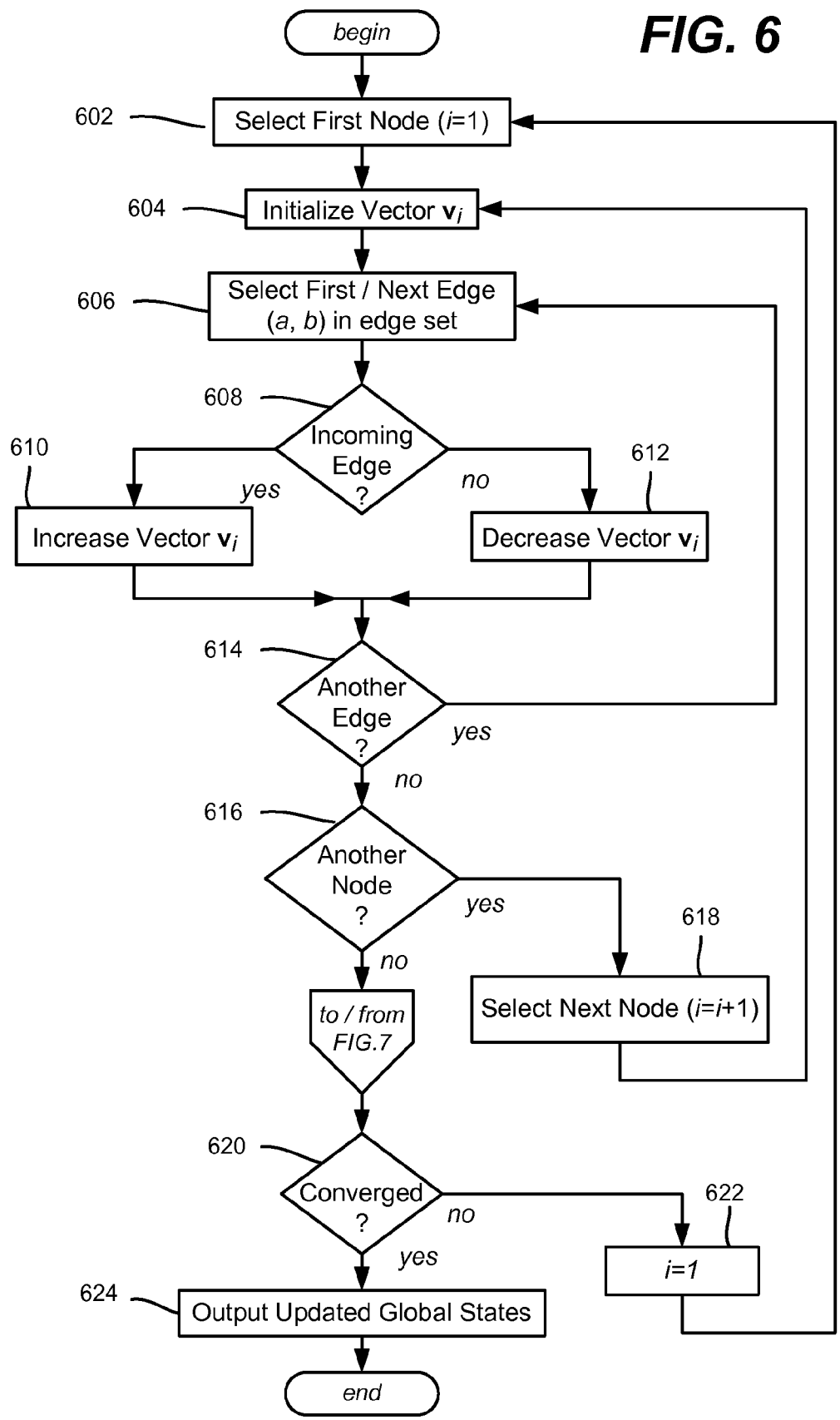
FIGS. 6 and 7 comprise a flow diagram representing example steps that may be taken to refine map data in a global state space, according to one or more example embodiments
Figure 7:
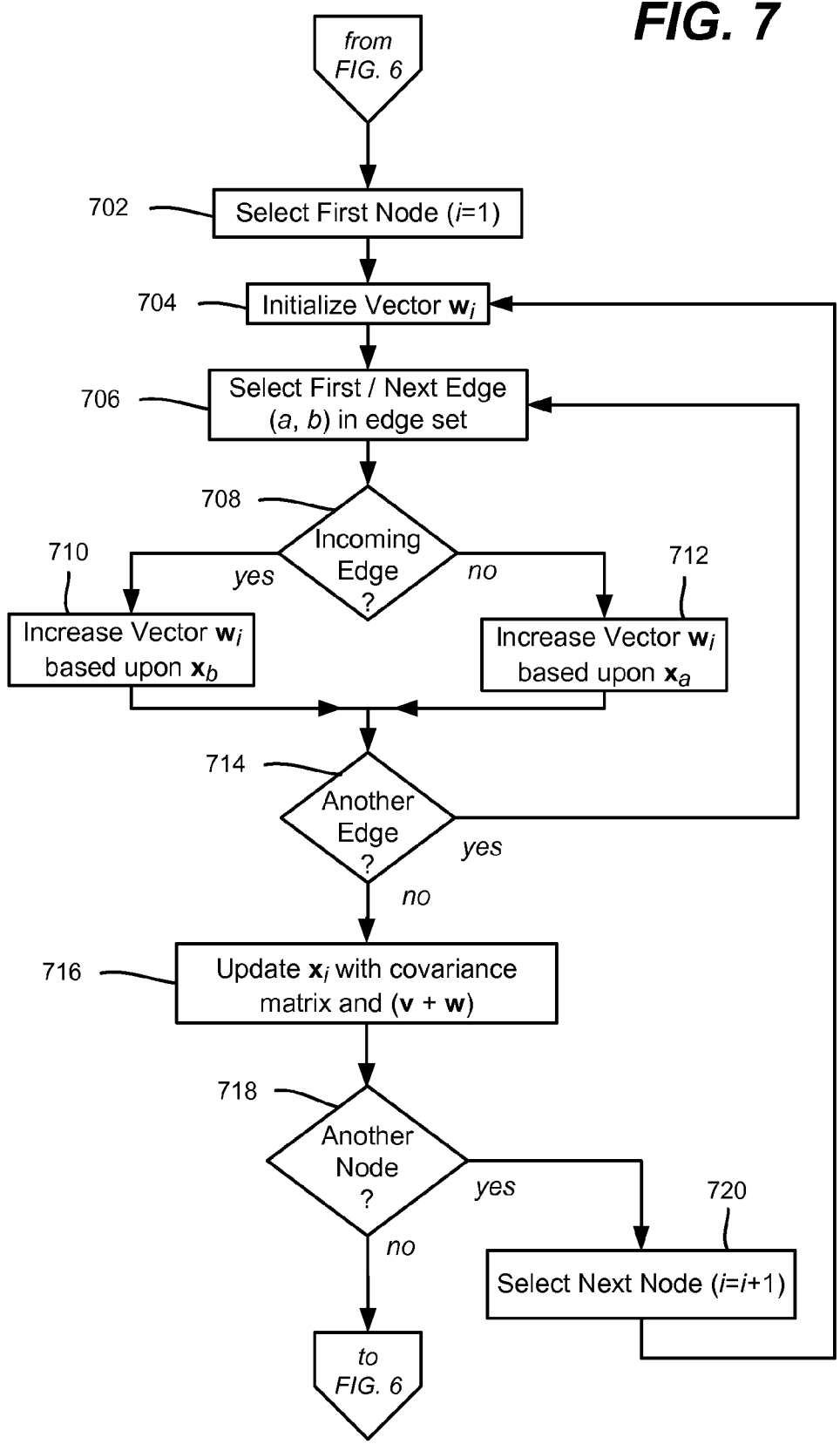

Input: global states $x_{1:n}$, $\delta_{ab}$ and $\Omega_{ab}$ $\forall(a, b) \in \varepsilon$
Output: updated global states $x_{1:n}$
while not converged do ▷ Note: step 620 of FIG. 6
  ▷ Compute v
  for i ← 1 to n do   ▷ Note: steps 602, 616 and 618 of FIG. 6
    $v_i \leftarrow 0_{\{3 \times 1\}}$   ▷ Note: step 604 of FIG. 6
    for (a, b) ∈ ε do   ▷ Note: steps 606 and 614 of FIG. 6
      if a == i then   ▷ Note: step 608 of FIG. 6
        $v_i \leftarrow v_i + \overline{\Omega}_{ab}R(\theta_a)\delta_{ab}$   ▷ Note: step 610 of FIG. 6
      else if b == i then   ▷ Note: step 608 of FIG. 6
        $v_i \leftarrow v_i - \overline{\Omega}_{ab}R(\theta_a)\delta_{ab}$   ▷ Note: step 612 of FIG. 6
      end if
    end for
  end for
  ▷ Minimize
  for i ← 1 to n do   ▷ Note: steps 702, 718 and 720 of FIG. 7
    $w \leftarrow 0_{\{3 \times 1\}}$   ▷ Note: step 704 of FIG. 7
    for (a, b) ∈ ε do   ▷ Note: steps 706 and 714 of FIG. 7
      if a == i then   ▷ Note: step 708 of FIG. 7
        $w \leftarrow w + \overline{\Omega}_{ab}x_b$   ▷ Note: step 710 of FIG. 7
      else if b == i then   ▷ Note: step 708 of FIG. 7
        $w \leftarrow w + \overline{\Omega}_{ab}x_a$   ▷ Note: step 712 of FIG. 7
      end if
    end for
    $x_i \leftarrow \overline{\Omega}_i^{-1}(v_i + w)$   ▷ Note: step 716 of FIG. 7
  end for
end while

---

Figure 4:
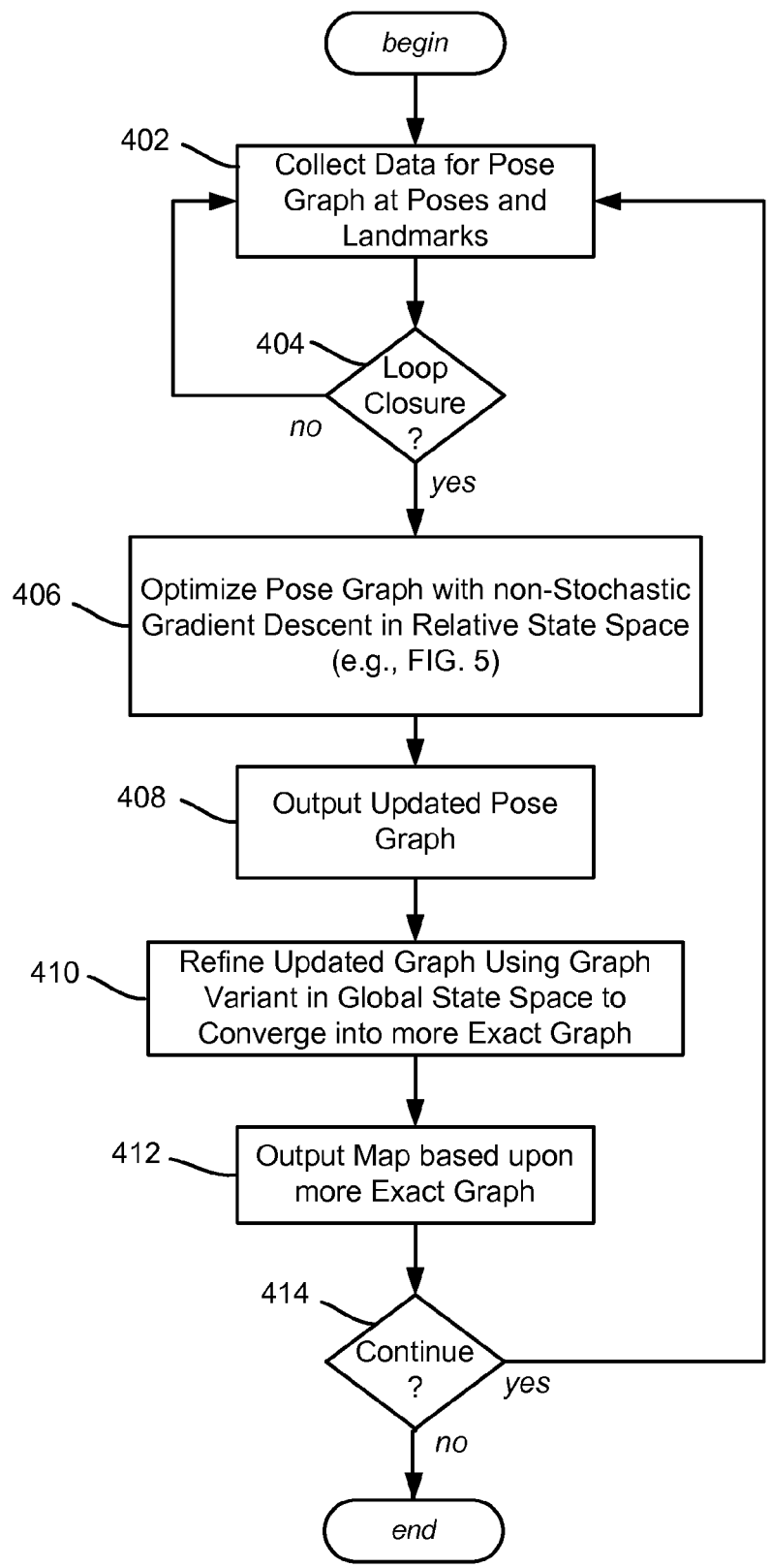
FIG. 4 a flow diagram including example steps that may be taken to correct map data, according to one or more example embodiments.

FIG. 4 summarizes some of the above steps, beginning at step 402 where the data is collected from the sensors. Step 404 detects loop closure. Note that at least some advance processing may be performed on the sensor data in advance, e.g., with enough resources, data collected in a global state space may be transformed into a relative state space without waiting for loop closure detection.

Step 406 represents optimizing the pose graph, including preparation of the data and with the use of non-stochastic gradient descent in relative state space. FIG. 5 provides example details of step 406.

For example, step 502 represents computing the relative states given the pose estimates in the initial sensor data (which is in global state space, for example). Step 504 computes the relative poses as described above.

Step 506, which is represented in the exemplified phase one pseudocode, computes the residual for each edge.

Beginning at step 508, the convergence loop begins; (although as described herein, convergence may be determined by stopping after a number of iterations rather than detecting a convergence threshold or the like). For each selected edge, step 510 evaluates whether the nodes are consecutive or not. As shown in more detail in the exemplified phase one pseudocode, consecutive nodes have their state data updated via step 511, while nonconsecutive nodes have each of their nodes updated via step 512.

Step 514 repeats the process for each edge; note that step 515 may recomputed the relative poses when a loop closure edge is encountered. Step 516 represents stopping when the convergence condition or other stopping criterion (or criteria) is met.

Returning to step 408, the pose graph has now been updated with the non-stochastic gradient descent in relative state space technology described herein. At this time, the updated pose graph may be output used as is, however as described herein, a more exact graph may be provided by the modified graph technology in global state space.

Steps 410 and 412 represent the second phase as described above. FIGS. 6 and 7 provide example details of one implementation of step 410; note that the steps are described with reference to the above pseudocode for the modified graph algorithm, and thus are not again described individually.

In general, the graph variant in global state space solution represented in FIGS. 6 and 7 and the corresponding pseudo-code provides a more exact solution to the previous pose graph estimate provided by the relative state space algorithm and pseudocode represented in FIG. 5. Note however that FIGS. 6 and 7 may be used to refine pose graphs provided in other ways, (and also may be used to solve other problems that may be solved using the Gauss-Siedel solution).

In the graph variant in global state space solution, the equation is linearized by assuming that $R(\theta_a)$ is constant. This yields a quadratic equation whose derivative yields Ax=v. One iteration of Gauss-Seidel is applied to Ax=v to get a better estimate for x, which is then used to re-estimate $R(\theta_a)$, which then changes v. Then another iteration of Gauss-Seidel with the new v is applied, and so forth, until convergence.

Thus, instead of iterating with the same A and b until convergence, then recomputing A and b and repeating until convergence as in conventional Gauss-Seidel, the graph variant process computes A just once, then iterates with a new b each time until convergence.

One or more aspects are directed towards collecting data corresponding to mobile device movement into a pose graph. When loop closure has occurred, the pose graph is optimized, including processing the pose graph based upon stochastic gradient descent, and iterating to update states in a relative state space. An updated pose graph having updated edge data may be output.

Processing the pose graph based upon stochastic gradient descent may include using non-stochastic gradient descent, comprising a variation of stochastic gradient descent having edges as constraints chosen in a deterministic order. This may include selecting the edges in the deterministic order based upon a number of affected nodes, such as in decreasing order of the number of nodes they affect.

Collecting the data may comprise obtaining initial pose estimate data from device sensors, with initial pose estimate data processed into relative states. Relative pose data, including at least one non-consecutive relative state, may be computed.

Iterating to update the states may comprise converging to a local minimum. Alternatively, iterating to update the states may be stopped based upon a number of iterations.

The updated pose graph may be input into a later-phase global graph processing component that iterates in a global state space to optimize the updated pose graph into a more optimal pose graph. Map data corresponding to the updated pose graph, and/or the more exact pose graph, may be output for viewing or storing.

One or more aspects include a mapping component coupled to a mobile device, in which the mapping component includes a map corrector that processes collected sensor-estimated data into a corrected map based upon differences in the collected sensor-estimated location data and a mobile device location at a time of loop closure detection. The map corrector includes a non-stochastic gradient descent component, comprising a stochastic gradient descent configured to operate in a deterministic order on constraint data in relative state space, including to iteratively update the sensor-estimated data into corrected data corresponding to a local minimum to provide the corrected map.

The collected sensor-estimated data may correspond to a graph of nodes representing poses, and edges between the poses representing translation and rotation data. The constraint data may comprise the edge data of the edges.

The corrected map may comprise a pose graph. A later phase graph component configured to operate in global state space may refine the pose graph into a more optimal graph.

One or more aspects are directed towards optimizing a pose graph using a relative state space into a modified pose graph, and refining the modified pose graph using a global state space into a more exact pose graph. Optimizing the pose graph may include using the relative state space, including iterating edge data to modify states of nodes to reduce residual data to a local minimum. Relative states may be computed based upon sensor pose estimate data.

As can be seen, there is provided solutions to the loop closure problem via non-stochastic gradient descent in the relative state space, and/or via a graph variation of Gauss-Seidel in the global state space. Although non-stochastic gradient descent in relative state space and the graph variation technologies in global state space are each a standalone solution, in one or more implementations, the two solutions may be combined in a two-step approach, first using non-stochastic gradient descent in the relative state space, followed by the graph-based variation of Gauss-Seidel in the global state space. In most situations, the two solutions exhibit complementary characteristics, in that the non-stochastic gradient descent quickly gets near the global minimum, even with poor initial conditions, while the graph variation is better at performing detailed refinements of the estimate but benefits from a starting point near the global minimum.

For example, even in the case of complex graphs with many interconnections and a very corrupted input, the phase one technology is able to get to a close solution quickly, allowing phase two to take over and optimize a local minimum to a more exact, global minimum solution. As one example, the technology described herein was able to successfully optimize a graph of up to 40 million nodes in just over two seconds per iteration; the results were provided an optimized graph that closely resembles a ground truth test graph.

Thus, using the phase one solution as a starting point quickly reaches a local minimum, that may be provided to a phase two solution, comprising a fast variant of Gauss-Seidel. This phase two solution, using a global state space, is able to make finer adjustments to the poses, thus enabling it to settle into a good solution with low residual. Although phase two processing may use many iterations, each iteration is extremely fast. Accurate correction was achieved relative to other solutions, in less time and with fewer iterations. Moreover, the technology described herein scales well, able to operate on graphs on the order of tens of millions of nodes.

Example Operating Environment

As mentioned, advantageously, the techniques described herein can be applied to any device that is mobile and equipped with one or more sensors. It can be understood, therefore, that robots, handheld, wearable, portable and other computing devices and computing objects of all kinds are contemplated for use in connection with the exemplified embodiments. For example, a general purpose remote computer described below in FIG. 8 is but one example of a computing device that may form much of the hardware and underlying software platform for a robot device or other similar machine.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
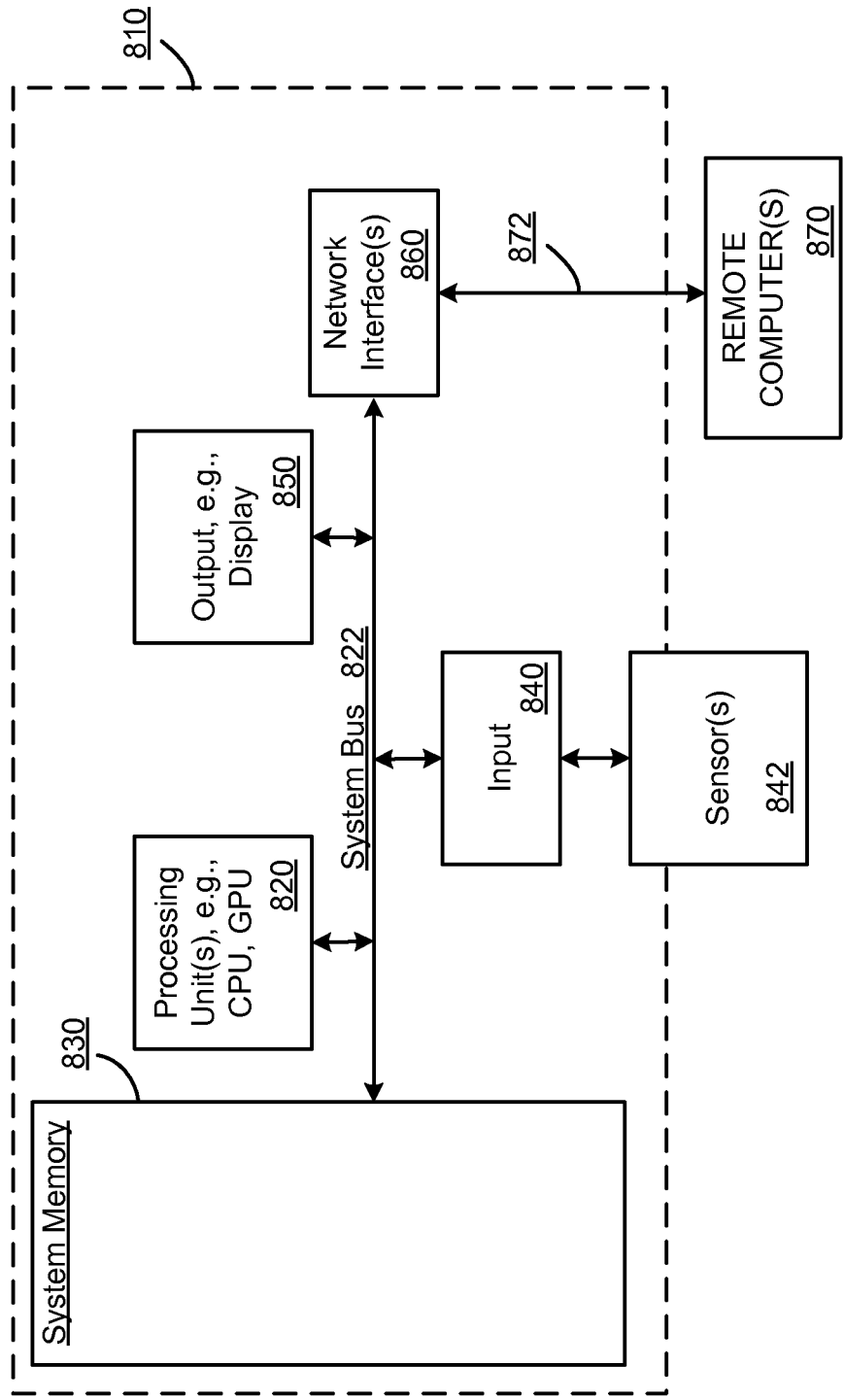
FIG. 8 is a block diagram representing an exemplary non-limiting computing system or operating environment, such as incorporated into or coupled to a mobile robot, into which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer/machine readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
   collecting, in a memory, data corresponding to mobile device movement into a pose graph,
   receiving, at a processor, an indication that loop closure has occurred,
   optimizing the pose graph including processing the pose graph based upon stochastic gradient descent, including iterating to update states in a relative state space; and
   outputting an updated pose graph from said optimizing.

2. The method of claim 1 wherein processing the pose graph based upon stochastic gradient descent comprises using non-stochastic gradient descent a variation of stochastic gradient descent having edges as constraints chosen in a deterministic order.

3. The method of claim 2 further comprising, selecting the edges in the deterministic order comprises selecting the edges based upon a number of affected nodes.

4. The method of claim 3 wherein selecting the edges comprises selecting the edges in decreasing order of the number of nodes they affect.

5. The method of claim 1 wherein collecting the data comprises obtaining initial pose estimate data from sensors, and further comprising, processing the initial pose estimate data into the relative state space.

6. The method of claim 5 further comprising, computing relative pose data, including at least one non-consecutive relative state space.

7. The method of claim 1 wherein iterating to update the states comprises converging to a local minimum.

8. The method of claim 1 further comprising, stopping iterating to update the states based upon a number of iterations.

9. The method of claim 1 further comprising, outputting map data corresponding to the updated pose graph.

10. The method of claim 1 further comprising, inputting the updated pose graph in to a global graph processing component that iterates in a global state space to optimize the updated pose graph into a more optimal pose graph.

11. The method of claim 10 further comprising, outputting map data corresponding to the more optimal pose graph for viewing or storing.

12. A system comprising a processor and a memory associated with a mobile device, the system further comprising: a mobile device mapping component coupled to the mobile device, the mobile device mapping component including a map corrector configured to process collected sensor-estimated data into a corrected map based upon at least one difference in the collected sensor-estimated location data and a mobile device location at a time of loop closure detection, the map corrector including a non-stochastic gradient descent component based upon stochastic gradient descent in which the non-stochastic gradient descent component is configured to operate in a deterministic order on constraint data in relative state space, including to iteratively update the sensor-estimated data into corrected data corresponding to a local minimum to provide the corrected map.

13. The system of claim 12 wherein the collected sensor-estimated data corresponds to a graph of nodes representing poses and edges between the poses representing translation and rotation data, and wherein the constraint data comprises edge data of the edges.

14. The system of claim 12 wherein the corrected map comprises a pose graph, and further comprising, a later phase graph component configured to operate in global state space to refine the pose graph into a more optimal graph.

15. The system of claim 12 wherein the mobile device comprises a mobile robot configured with one or more odometry sensors.

16. The system of claim 15 wherein the one or more odometry sensors include a wheel-based sensor, or a camera-based sensor, or both at least one wheel-based sensor and at least one camera-based sensor.

17. One or more machine-readable storage devices having executable instructions, which when executed by a processor perform operations, comprising:
    collecting data corresponding to mobile device movement into a pose graph,
    optimizing the pose graph into a modified pose graph;
    refining the modified pose graph using a global state space into a more exact pose graph, including computing a matrix and estimating a new vector based upon the matrix within each iteration of a plurality of iterations until convergence; and
    outputting a map based upon the more exact pose graph upon convergence.

18. The one or more machine-readable storage devices of claim 17 having further executable instructions comprising, optimizing the pose graph using a relative state space.

19. The one or more machine-readable storage devices of claim 18 having further machine-executable instructions comprising computing relative states based upon sensor pose estimate data.

20. The one or more machine-readable storage devices of claim 18 having further machine-executable instructions comprising optimizing the pose graph based upon stochastic gradient descent.

* * * * *